United States Patent [19]

Smith

[11] Patent Number: 5,020,023

[45] Date of Patent: May 28, 1991

[54] AUTOMATIC VERNIER SYNCHRONIZATION OF SKEWED DATA STREAMS

[75] Inventor: Thomas B. Smith, Wilton, Conn.

[73] Assignee: International Business Machines Corporation, Armonk, N.Y.

[21] Appl. No.: 314,608

[22] Filed: Feb. 23, 1989

[51] Int. Cl.⁵ .............................................. G06F 11/16
[52] U.S. Cl. ................................. 364/900; 364/919;
364/926.3; 364/926.5; 364/931.45; 364/939.81;
364/943.9; 364/945.8; 364/945.9; 364/238.7;
364/239.51; 364/265.1; 364/266.1; 364/268.7;
364/268.9
[58] Field of Search ............... 364/200, 900; 371/36,
371/16, 61; 375/113

[56] References Cited

U.S. PATENT DOCUMENTS

| | | | |
|---|---|---|---|
| 3,812,476 | 5/1974 | Cragon | 371/36 |
| 4,275,457 | 6/1981 | Leighou et al. | 364/900 |
| 4,571,671 | 2/1986 | Burns et al. | 364/200 |
| 4,731,724 | 3/1988 | Michel et al. | 364/200 |
| 4,733,353 | 3/1988 | Jaswa | 364/200 |

*Primary Examiner*—Gareth D. Shaw
*Assistant Examiner*—John C. Loomis
*Attorney, Agent, or Firm*—Whitham & Marhoefer

[57] ABSTRACT

A technique for automatically removing the skew between multiple correlated synchronous data streams provides Vernier Skew compensation. The data streams are marked into data frames under the control of local synchronized transmitter clocks. The data streams received at a receiver are loaded into FIFO registers under the control of recovered clocks. Data from the FIFO registers are unloaded under the control of a local receiver clock synchronized with the transmitter clocks. The frame marked data in the data streams is checked for a synchronization fault at the receiver. When a synchronization fault is detected in a data stream, the loading and unloading of the FIFO register corresponding to that data stream is inhibited and then the FIFO register is enabled with the first value to arrive which is marked as a frame header. At the next succeeding time for an expected frame header, normal unloading of the FIFO register is initiated. An alternate embodiment substitutes bi-port register arrays for the FIFO registers providing greater simplicity and flexibility.

8 Claims, 4 Drawing Sheets

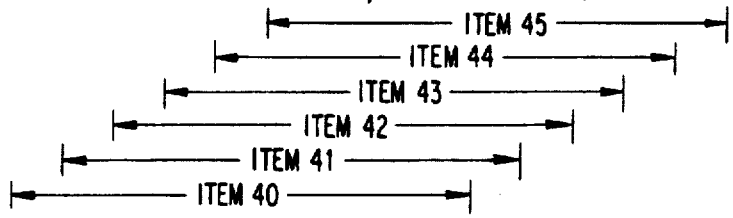
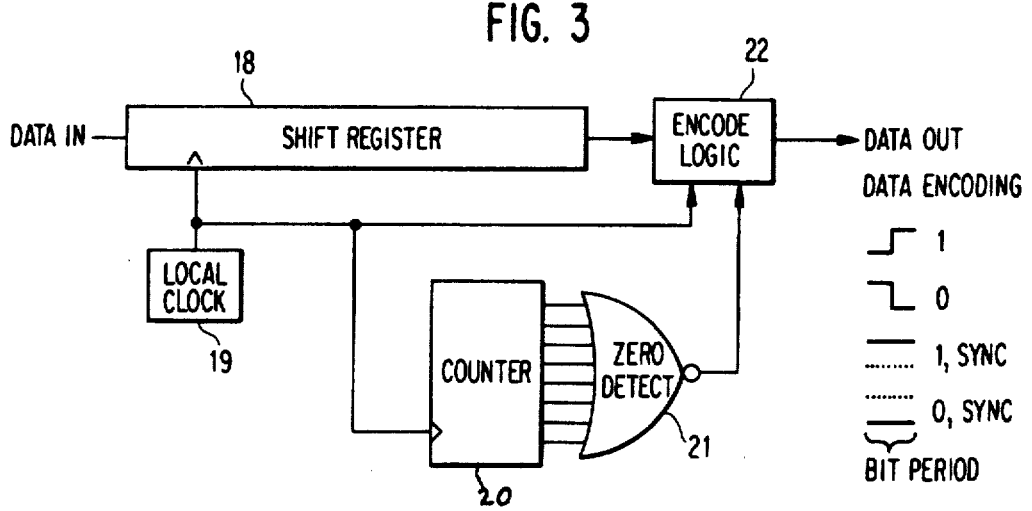

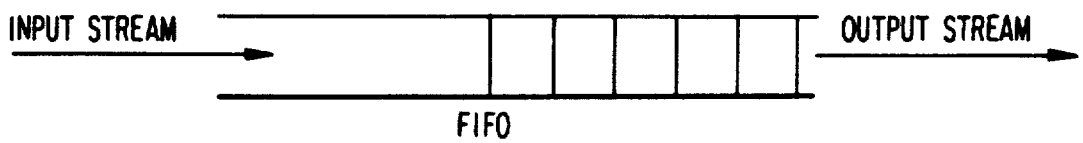
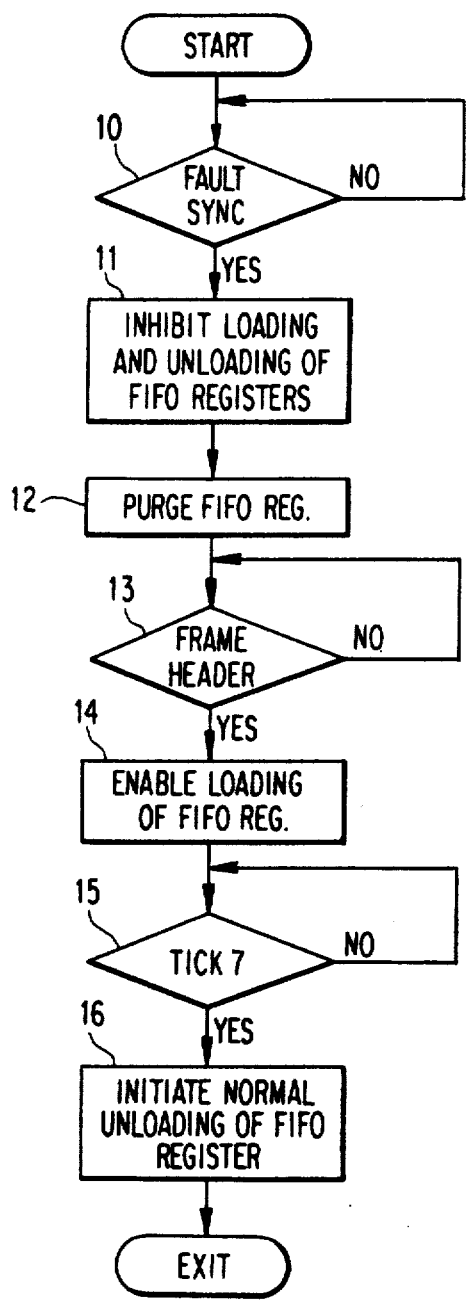

AUTOMATIC VERNIER SYNCHRONIZATION OF SKEWED DATA STREAMS

CROSS REFERENCE TO RELATED APPLICATION

The invention described in this application is related to an invention disclosed in my copending application Ser. No. 07/262,416 filed Oct. 25, 1988, entitled "Synchronized Fault Tolerant Clocks for Multiprocessor Systems" and assigned to the assignee of this application. The disclosure of application Ser. No. 07/262,416 is incorporated herein by reference.

BACKGROUND OF THE INVENTION

1. Field of the Invention

This invention generally relates to a technique for automatically removing the skew between multiple correlated synchronous data streams and, more particularly, to a technique of encoding correlated synchronous transmissions from multiple sources to a receiver such that any skew which may be present between the several transmitters and the transmitters and the receiver can be easily removed. The invention has applications in input/output (I/O) control, distributed signal processing and high speed, very large memory systems, among others.

BACKGROUND OF THE INVENTION

An increasingly significant problem encountered in very high performance multiprocessor systems is the problem of skew between multiple correlated synchronous data streams. Such skew effects arise in a synchronous machine architecture for a variety of reasons. For example, the time bases of synchronously operating transmitters and receivers may be skewed relative to one another, and propagation delays between transmitters and receivers may vary, inducing skewed arrivals. These skew effects can be significant relative to the data rates of the data streams, and the receivers have a need to quickly establish the correlation between data items in the multiple streams and their linkage to an idealized time base.

Consider, for example, a system in which a signal processing problem has been distributed over multiple linked and synchronously operating computing elements, as is often the case. As a fragment of this structure, a receiving element is expected to receive a stream of variables from two other elements. Each variable in one stream is multiplied by the corresponding variable in the other stream and the result is transmitted to the next stage of the computation. With perfect synchronism (i.e., no skew), this operation is trivial. However, with large skew relative to the variable flow rate, this operation is impossible without additional information content.

As an alternate example, consider a potential organization for a very large high performance auxiliary memory system. Each memory request is addressed to multiple memory modules which operate in parallel. Each returns a vertical slice of the data stream in a read request. For example, thirty-nine memory modules might be operated in parallel with each module providing a single bit of a thirty-nine bit memory word. With thirty-nine bits, simple error correction processing could provide single bit error correction, based on a thirty-two bit data word and seven bits of error correction. Any single memory module failure could thus be tolerated, but the receiver must be able to correctly associate the bits from each module with one another to assemble the thirty-nine bit memory word.

A high performance memory system could stream data from memory at a gigaword per second rate. This implies transmissions from each module at a gigabit per second. Fault containment mechanisms, which are required to assure that single faults impact no more than one module, tend to make control of the skew between modules difficult. Practical systems might exhibit skew between modules of twenty to forty nanoseconds (20 to 40 bit periods) for this example. Ideally, the receiver should be able to stream the correctly assembled words through its error correction circuitry with minimal latency. To do this, it must assemble the words, removing any skew, with minimal latency.

A third example uses skew compensation to remove the skew effects at the I/O interface of a triple redundant computing system. To do this, an I/O interface must remove the skew in the transmissions from the triplexed computing elements, and it must assure that all redundant elements receive identical inputs which are temporally aligned with respect to the internal operation of each element. In a specific embodiment, an I/O interface for the Fiber Distributed Data Interface (FDDI) token ring would vote the identical 100 megabit per second transmissions from triplexed controllers, removing any skew between these elements. Skews of 100 nanoseconds (10 bit periods) might be typical of a routine embodiment in CMOS technology. The voted bit stream is then transmitted on a non-redundant FDDI serial link.

Simple voting algorithms are of course well known in the art and can tolerate any single transmission source failure, but previous implementations have not been able to compensate for skew, or the skew compensation techniques were inefficient resulting in a large latency between the redundant source transmissions and the non-redundant transmissions from the voting element. Typically, when skew is present, the I/O interface buffers an entire packet from each controller before voting the packets and retransmitting the result. This interposes a whole packet's latency in the output path. Packets are generally on the order of 128 bytes (1280 bits using FDDI protocols), and this would, as a result, interpose thirteen microseconds of latency plus circuit and processing delays (at the FDDI 100 megabit per second transmission rates). FDDI protocols cannot tolerate such delays. An example of the prior art which uses packet buffering in its skew compensation algorithm is described in a paper by the inventor entitled "High Performance Fault Tolerant Real Time Computer Architecture" which was presented at the 16th Annual International Symposium on Fault-Tolerant Computer Systems at Vienna, Austria, 1-4 July 1986, FTCS Digest of Papers at pages 14 to 19. This machine was forced toward relatively inefficient small packet sizes precisely because of the desire to minimize latency.

Data flow in the opposite direction requires that the data be replicated and that identical data be presented to each of the triple redundant I/O controllers at exactly the same moment with respect to their local time bases. The basic algorithm for tolerating faults in the replication process is well known and was also used in the above cited "High Performance Fault Tolerant Real Time Computer Architecture", but as with the output data path, the base algorithm cannot tolerate skew.

Prior art enhancements to the base algorithm have been inefficient, relying upon whole packet buffering to provide skew compensation and interposing two packet transmission periods of latency between the non-redundant link interface and the second stage of the triplexed controller interface. For typical packet sizes, this is 26 microseconds.

Other examples of the prior art are the SIFT machine described in the October 1978 issue of the *Proceedings of the IEEE* and the FTP machine described in the "Digest of the 11th International Fault-Tolerant Computing Symposium", Portland, Maine, June 1981. Each of these systems used full packet (or message) buffering to implement skew compensation. The SIFT machine implemented these algorithms in software and was forced to fairly large message sizes to minimize software burdens of these algorithms. As a result, it incurred several milliseconds of interposed latency in its I/O paths.

SUMMARY OF THE INVENTION

It is therefore an object of this invention to provide a technique for automatically removing the skew between multiple correlated synchronous data streams.

It is another more specific object of the invention to provide an encoding technique for correlated synchronous transmissions from multiple sources to a receiver such that any skew which may be present between the several transmitters and the transmitters and the receiver can be easily removed, with minimal latency.

It is a further object of the invention to provide a means for economically and automatically removing skew effects between multiple correlated synchronous data streams at a receiver.

According to the invention, there is provided a means of holding early arriving variables until they are consumed and a means of determining when a variable is to be consumed. The first means is implemented as a first in, first out (FIFO) register. The second means is implemented by detecting frame marks. Since transmissions are synchronous, frames can be unambiguously identified by their arrival times. Frames are delineated by marking the first variable of the frame. Synchronization is triggered by a synchronization fault. The procedure first inhibits loading and unloading of the FIFO register. The FIFO register is then purged. At the next clock tick when a frame mark is expected, the FIFO register is enabled to load starting with the first value to arrive which is marked. At the next succeeding clock tick when a frame mark is expected, normal unloading of the FIFO register is initiated.

In a specific application of the invention, a voting I/O channel is provided which can be used to connect a conventional (non-redundant) serial fiber optic channel path to a triple redundant processor or controller element. The implementation correctly performs the necessary data manipulative primitives required in converting from the simplex serial optic externals to the tightly synchronous triplex processor or controller internals (i.e., input replication). It also performs the necessary data manipulative primitives in converting from the triplex internals to the simplex serial optic externals (i.e., output voting). Performance of the resultant I/O channel is fully equivalent to that of a conventional I/O channel attachment to a non-redundant processor or controller, with minimal latency injected by the process. Additionally, the software appearance and characteristics are completely compatible with the conventional channel implementation, all I/O channel programs execute without modification, with equivalent performance and timing characteristics.

It will be observed that the subject invention bears a superficial resemblance to skew compensation algorithms that have been developed for deskewing data from the parallel tracks of multitrack magnetic tape units. These deskewing algorithms differ in a very significant way from the subject invention in that the source (the raw bit rate from the tape) is asynchronous with the receiver time base. The result is that the transmitters (the magnetic heads reading each track and their associated electronics) and the receiver (the tape controller) are operating asynchronously with respect to one another on different time bases. Deskew algorithms must therefore rely upon timeouts and other fairly complex and dynamic synchronization and flow control protocols between the transmitters and the receivers.

In the subject invention, the transmitters and receivers are operating synchronously with respect to one another, but are simply skewed with respect to one another. The invention provides skew compensation so that the transmitter and receiver appear to be precisely synchronous with one another. All of the relevant parameters of the skew compensation can be computed a priori from design and manufacturing specifications. The skew compensation can thus be static and more economically implemented than can that for asynchronous systems or, more importantly, they can be designed to operate at much higher data rates.

BRIEF DESCRIPTION OF THE DRAWINGS

The foregoing and other objects, aspects and advantages of the invention will be better understood from the following detailed description of a preferred embodiment of the invention with reference to the drawings, in which:

FIG. 1 is a block diagram illustrating the skew problem in the abstract;

FIG. 2 is a block diagram illustrating marked frames in a data stream according to the invention;

FIG. 3 is a block diagram showing an apparatus for marking a data stream into frames;

FIG. 4 is a block diagram illustrating the data flow structure employing a first in, first out (FIFO) register according to the invention;

FIG. 5 is a flow diagram showing the logic of the resynchronization process when using FIFO registers according to the invention;

DETAILED DESCRIPTION OF A PREFERRED EMBODIMENT OF THE INVENTION

Figure 6:
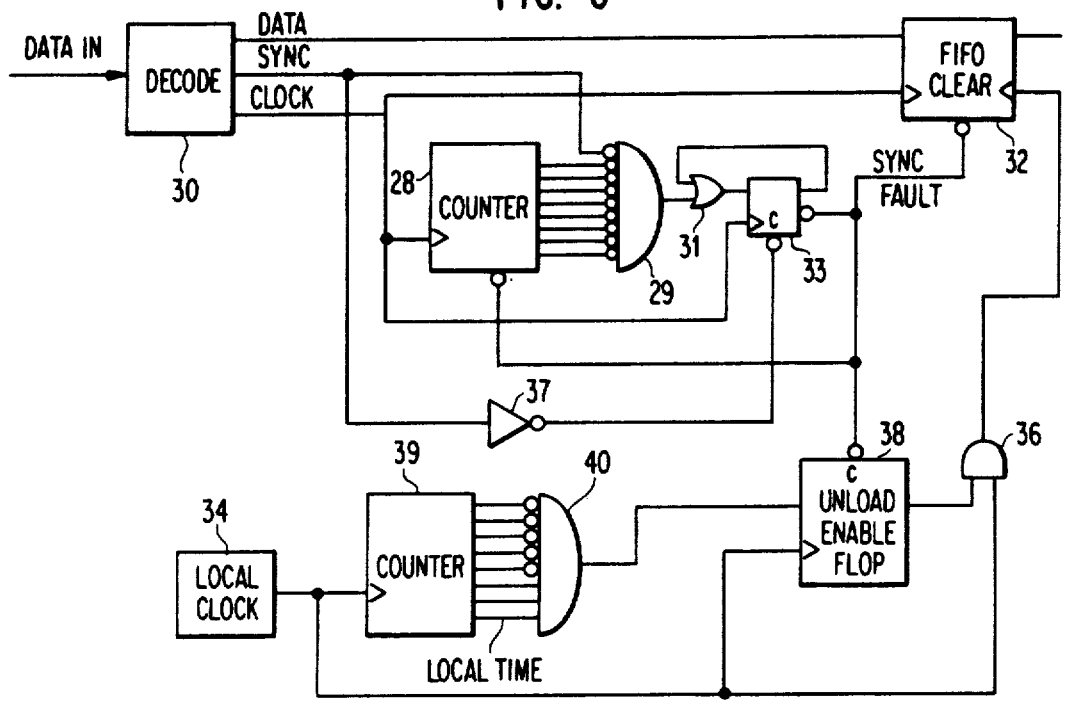
FIG. 6 is a block diagram showing an implementation of the automatic vernier synchronization using FIFO registers according to the invention.

Referring now to the drawings, and more particularly to FIG. 1, the skew problem is illustrated in the abstract. Suppose that among synchronously operating elements that some may be operating with a most leading time base and some may be operating with a most lagging, as indicated at lines 1 and 2. The perceived skew between most leading and most lagging, shown as line 3, is determined by the design parameters of the clocking/synchronization system. Further, suppose that the propagation delay from a transmitter to a receiver may vary; in the example illustrated, from one to three. If a data item and an associated transmitter clock are transmitted at each integer time interval in this example, then these skew effects are large relative to the transmission time of a single data item.

A receiver element cannot know whether it is operating on a most leading, most lagging or intermediate time base; whether a particular transmission is being received from a most leading, most lagging, or intermediate transmitter element; or whether the path from a particular transmitter to itself is short (minimum propagation delay) or long (maximum propagation delay). As a result, any particular item, denoted by its local time of transmission, can be thought of as potentially arriving in a broad window relative to the receiver's local time base, as illustrated by line 3. If the receiver is designed to synchronously process the data items, it cannot use an item until receiver local time is greater than the transmission local time plus maximum skew plus maximum propagation time. For example, if it is known that a particular data item is to be transmitted at local time 45 and the skew is three with a propagation delay of from one to three, then the item might not be available at the receiver until local time 52; i.e., the data item will arrive no later than 51 local time if it was transmitted at 45 local time. Note that with minimum propagation delay it may arrive as early as 43 local time. If each transmitter generates an item every integer interval of the local clock, then the receiver clearly has a problem identifying which of the unlabeled values corresponds to the value denoted 45, and the values denoted 45 from differing transmitters may be skewed by as much as 5 ticks, relative to one another on arrival.

Two problems need to be solved. First, a means of holding arriving variables until they are consumed is required, and second, a means of determining when a variable is to be consumed is needed. The problem of storage can be handled by first in, first out (FIFO) registers; however, the problem of when to consume a variable requires a more complex solution.

The latter problem can be solved by marking the data stream into data frames and by appropriate processing. The data frame should be long enough so that the skew effects (time base skew plus propagation uncertainty) are less than half the frame length. Skew effects are then small enough relative to the frame length that a receiver may unambiguously identify a frame by its arrival time. Frames can be delineated by marking the first variable of the frame. For the example of FIG. 1, a frame length of ten suffices. FIG. 2 illustrates this situation. Note that the window for one marked value does not overlap the window for the preceding marked value or the following. It is also now possible to change the notation such that data stream values are denoted cyclically by their position within a frame.

The encoding of the data stream can be performed in a number of ways. For example, if bytes are being transferred in parallel, a simple parity bit could serve for error detection and as a frame mark. The first byte could have even parity, and the rest, odd parity. Alternate codes, such as 8 of 10 and the like could also be used. The requirement is simply that the beginning of frame be marked. Selection of a code with minimal bandwidth impact is therefore appropriate.

A preferred embodiment of the apparatus for marking the frames is shown in FIG. 3. The data to be transmitted is shifted into a shift register 18 under the control of a local clock 19. The clock also drives an 8-bit binary counter 20 having an output connected to decoding logic 21. Logic 21 detects when the counter is zero (once every 256 bit periods in the specific example being described). Encode logic 22 encodes the bit stream so that data, clock and frame mark can be recovered at a receiver.

Encoding is as follows: During each bit period, a waveform is transmitted. On all but the zeroth bit period, the waveform will change in the middle of the bit period. It changes from low to high if the bit is a binary "1", and high to low if the bit is a binary "0". During a zeroth bit period which occurs once every 256 bit periods, the beginning of the frame is marked by suppressing this transition. A "1" with frame sync is transmitted by a steady high level, and a "0" with frame sync is transmitted by a steady low level. This encoding is a variation on what is commonly called "bi-phase encoding" or Manchester encoding.

Using the marked frames illustrated in FIG. 2, a data path can be constructed as illustrated in FIG. 4. Received data values are placed in a FIFO register for later use. Values are removed from the FIFO for consumption by the consuming machine. Since the transmitter and receiver are operating synchronously, the number of items going into the FIFO exactly matches the number being removed. The constraints are as follows:

a) The consuming machine should not try to remove an item before it can be assured (by worst case a priori analysis) that it is in the FIFO.

b) The FIFO should be deep enough to assure that it will not overflow due to worst case skew and propagation delays between the transmitter and the receiver.

c) The FIFO state or content is initialized or synchronized so that the proper value is removed or unloaded on each tick of the clock.

In the example being discussed, an attempt to remove a value should not occur until local time of transmission plus seven; e.g., the value denoted 40(0) and marked as the beginning of the frame can be removed at local time 47(7), 41(1) at 48(8), 42(2) at 49(9), 43(3) at 50(0), etc. This example also requires a minimum FIFO depth of nine. Note that if proper synchronization is achieved, it is automatically maintained; i.e., the relative time bases do not drift by more than the skew distance with respect to one another. Furthermore, note that it is easy to detect if synchronization has been lost since the value clocked out of the FIFO at (7) should be marked as a frame delimiter. If it is not, then the receiver and transmitter are not in synchronization with one another with respect to the data flow between them. A procedure is then required for obtaining synchronization.

Synchronization can be triggered by a synchronization fault. If when unloading the FIFO at tick (7), it is noted that the unloaded value is not marked as the frame header, then this is a synchronization fault. For this particular example, the FIFO can be resynchronized by the procedure illustrated by the flow diagram of FIG. 5, to which reference is now made. The procedure starts by monitoring for synchronization faults in decision block 10. This is accomplished, for example, by first detecting the clock tick (receiver clock tick (7) in the example being described) at which a frame mark is expected. Then, the received data is removed from the FIFO and checked for the frame mark. If there is no frame mark, a frame synchronization fault has been detected. When a fault is detected, loading and unloading of the FIFO register is inhibited at function block 11. Next, at function block 12, the FIFO register is purged. The incoming clock and data are then monitored for the next frame mark at decision block 13. When detected, normal loading of the FIFO is re-enabled, at block 14, starting with the frame marked data. The receiver then waits until local tick (7), at block 15, and then re-enables normal FIFO unloading, at block 16, starting with the frame marked data.

Since such an automatic adjustment is, in effect, adjusting for fractional frame skew, it is called Vernier Synchronization. Whole frame synchronization is not required as the frame is long enough so that all elements of the system are always in whole frame synchronism with one another.

FIG. 6 shows and implementation of the procedure illustrated in the flow diagram of FIG. 5. Decode logic 30 receives the data stream and, using a phase locked loop keyed to the waveform transitions in the center of the bit period, recovers the clock. Every bit period, except the frame mark bit period, has such a transition making the design of this phase locked loop simple. The phase locked loop parameters are selected so that the output remains stable across single bit periods without a transition. The regenerated clock makes the detection of the sync marking the frame easy.

Data is loaded into FIFO register 32 under the control of the recovered clock from the decode logic 30 and is read out of the FIFO register 32 under the control of a local clock 34 via AND gate 36. It will be understood that the local clock 34 and the recovered clock are synchronous but may be skewed with respect to one another. The recovered clock from decode logic 30 drives an 8-bit binary counter 28, the outputs of which are supplied to an AND gate 29. The AND gate 29 also receives the sync output from the decode logic 30. All inputs to the AND gate 29 are inverted so that when the counter rolls over to zero corresponding to an expected sync pulse, a sync pulse will hold the output from the AND gate low. On the other hand, if no sync pulse is applied to the AND gate when the counter rolls over to zero, the output from the AND gate will go high providing a detection of a sync fault.

A high output from AND gate 29 is applied via OR gate 31 to clocked latch 33 setting the latch. The feedback from the latch 33 to the OR gate 31 holds the latch set until it is cleared by the next sync pulse via inverter 37. The sync fault output from latch 33 is used to clear the FIFO register 32 and to hold the counter 28 to a zero count. It is also used to set an unload enable flip-flop 38 which inhibits AND gate 36 from passing clock pulses to the FIFO register 32. The local clock 34 drives a second 8-bit binary counter 39 having its outputs connected to AND gate 40 to decode the seventh tick local time. Thus, when the next sync pulse is received, data is again loaded into FIFO register 32 and at the seventh tick of the local clock after the sync pulse is received, data is again unloaded from the FIFO register.

The above description employing FIFO registers, while conceptually simple, is not an optimal solution. A more minimal solution exists. With current LSI (large scale integration) technology, it is fairly easy to construct true two ported register arrays of modest size. In such arrays, registers can be simultaneously read or written from both ports with no interference between the two ports, provided they are both not attempting to write the same register or one is attempting to read a register that is being written by the other. Most FIFO registers are in fact implemented with such bi-port register arrays and surrounding logic. The surrounding logic includes an input counter for loading successive locations in the bi-port register array, and an output counter for unloading successive locations, as well as logic for detecting empty FIFO, full FIFO, and other conditions by comparing these counter values. In total, this surrounding logic is more complex than is required.

Figure 7:
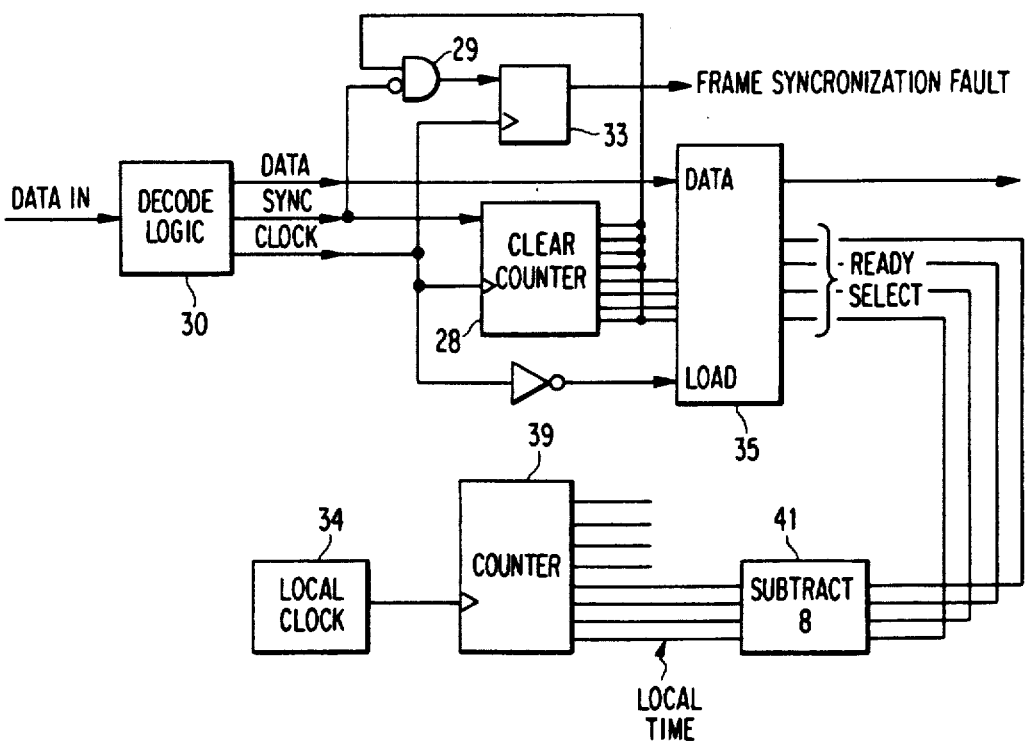
FIG. 7 is a block diagram showing an implementation of the automatic vernier synchronization using an array of bi-port registers according to the invention.

The preferred embodiment is illustrated in FIG. 7 which shows a bi-port register array 35. The same decode logic 30 is used as in FIG. 6. The recovered clock drives a synchronous 8-bit binary counter 28. This counter has a synchronous clear such that if the clear is asserted, then the counter is cleared at the next clock pulse. The counter is thus cleared to zero by a frame sync pulse arrival.

Data is loaded into the bi-port array 35 at an address determined by the lower four bits of the counter 28. The system is then automatically self-aligning since the zeroth bit period bit always goes into the zeroth slot of the bi-port array. The bi-port array acts as a circular buffer sixteen bits deep, with the 0th, 16th, 32nd, 48th, . . ., bits always falling into slot zero of this file, the 1st, 17th, 33rd, . . ., bits falling into slot 1, and so on.

Read select lines allow the absorbing receiver to directly specify the bit to be received. The read select lines are derived from a second synchronous 8-bit binary counter 39 driven by a local clock 34. The low order outputs are subtracted by eight in subtract logic 41 so that readout of the array 35 always lags the writing of data to the array.

The local clock counter time base is synchronous with the time base of the transmitter but may be skewed by a limited number of bit periods; i.e., the counter outputs may differ by some maximum amount. In the embodiment being described, the maximum skew is assumed to be six bit periods. The receiver can thus know that the 16th bit period bit will arrive no later than the local time 22 (receiver leads transmitter by six) or no earlier than 10 (receiver lags transmitter by six). The receiver can thus follow by eight bit periods local time in unloading a transmitted bit confident that it will arrive in time if it is leading or that it will not yet have been overwritten by the n+16th bit if it is lagging. The subtraction logic 41 makes this adjustment to the local time base and its output is used to control the read select.

The value of eight is convenient in that the subtract eight function can be easily implemented in binary arithmetic by complementing the fourth bit. The result is that the transmitter and the receiver appear to be exactly synchronous with one another but separated by exactly eight bit periods of transport delay.

The design for skew compensation assures that the input circuitry is not attempting to write the same register that the consuming circuitry is attempting to unload. A simple interlock between the two is only required if one is worried about a timing failure of the transmitter. In that case, an interlock which prevents the writing of a register while it is being read might be desirable to avoid metastable problems in the receiver logic. Note additionally, that the bi-port register array can be further optimized by the deletion of provisions for reads from the input port and of provisions for writes from the output port.

A frame synchronization fault can be detected by comparing the output of the counter 28 to the frame sync signal. This would accomplished as in FIG. 6 by the AND gate 29 and latch 33. Since the circuit is self-aligning, this information is mostly of value in suppressing processing until the re-alignment occurs.

In a preferred implementation of the invention, serial transmitter/receiver components employing conventional encoding and decoding algorithms are employed. American Micro Devices (AMD) VLSI components, the AM7968 (transmitter) and AM7969 (receiver) are particularly well suited to this application. These components were specifically designed as a serializer/deserializer for FDDI and similar applications. The AM7968 synchronously accepts (with respect to its local time base) eight bit data items, encodes them into a ten bit data item, and serially transmits the data. A phase locked loop internal to the device frequency multiplies the local byte rate clock by ten to derive the bit rate clock. These devices can operate on 125 megabits per second. The receiver component, the AM7969, receives the serial bit stream and, using a phase locked loop, reconstructs the transmitter serial clock. The eight to ten bit encoding of the data stream assures that there are adequate numbers of transitions in the serial bit stream to allow this phase locked loop to operate correctly. The encoding also reserves a particular bit pattern as a synchronization symbol. This synchronization symbol is a bit pattern that only appears properly aligned within a whole ten bit symbol; i.e., the encoding is such that the synchronization symbol can never be observed straddling a symbol boundary due to the inadvertent juxtaposition of two otherwise legitimate symbols. This synchronization symbol is used by the receiver to establish symbol alignment with respect to the serial bit stream. It is also used as a frame mark. The receiver provides decoded data items and a byte clock associated with those items. These data items and the associated clock are skewed with respect to the local time base of the receiver by the underlying skew between the transmitter and the receiver time bases and by transport (circuit) delays.

Figure 8:
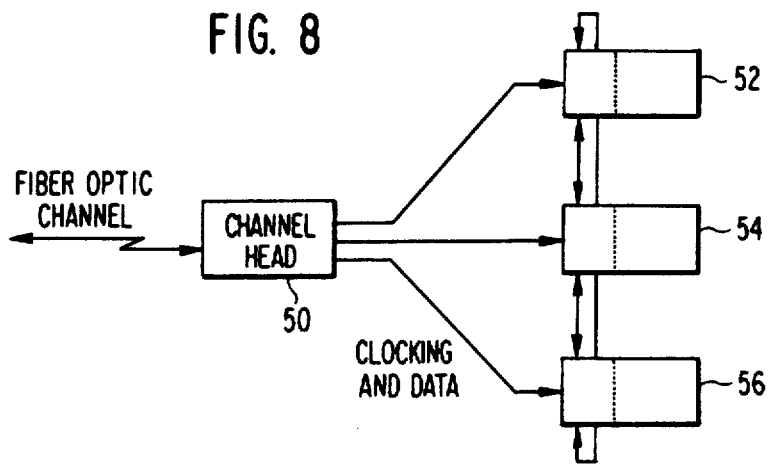
FIG. 8 a block diagram illustrating the organization of a voting I/O channel according to the invention.

In a specific application shown in FIG. 8, a voting I/O channel comprises a channel head 50 and triplex channel engines 52, 54 and 56. The channel head 50 performs the following functions. It accepts three synchronization clock signals from the triplex channel engines 52, 54 and 56, votes them and phase locks to this voted signal in order to create the channel head local synchronization time base. The phase lock mechanism can also be used to frequency multiply the synchronization clock so as to create a local time base of arbitrarily high frequency, but tightly phase locked to a lower frequency synchronization signal. The channel head 50 performs the electronic to optical and optical to electronic conversions intrinsic to the serial optic fiber attachment to the channel head. It also decodes and regenerates the incoming channel data bit stream, synchronizes this bit stream with the triplex channel engine synchronization signals, and replicates and transmits a copy of the bit stream to each of the three channel engines 52, 54 and 56 of the triplexed processor or controller.

The channel head 50 receives the triplicated bit stream from the triplexed channel engine, removes any skew between these three streams, votes this bit stream bit for bit and then encodes and transmits the resultant majority signal on the fiber optic link. It detects and notes any disagreements between the three transmitted bit streams or synchronization signals of the triplexed channel engine. Finally, it replicates the error indications and transmits a copy to each of the three channel engines; i.e., it transmits a triplexed copy to the triplexed channel engine 52, 54 and 56. The error indications are typically most conveniently piggy backed onto the normal incoming channel data bit stream, but it could be transmitted separately.

It should be noted that the channel head is unaware of the semantic content of the incoming or outgoing channel data bit streams; it is particularly unaware of and incapable of computing the cyclic redundancy check sums (CRC codes) associated with these data flows. It is therefore assumed that any fault in the channel head which corrupts data passing through the head will be detectable at the receiver using the CRC codes.

The triplexed channel engines 52, 54 and 56 are each equivalent in design to a standard non-redundant channel engine. Each of the three independent channel engines operates in apparent tight micro-instruction synchronism with one another, receiving identical commands and data from an associated processor or controller component of the triplexed processor or controller to which it is attached, and additionally processing an identical incoming data stream from the channel head. Note that each of these independent channel engines must receive identical or congruent stimulus.

The channel engine front end is responsible for assuring that the channel head inputs to the channel engine back-end are identical or congruent. Data flow through the front end is shown schematically in FIGS. 9A and 9B respectively for incoming transmissions and outgoing transmissions.

Figure 9A:
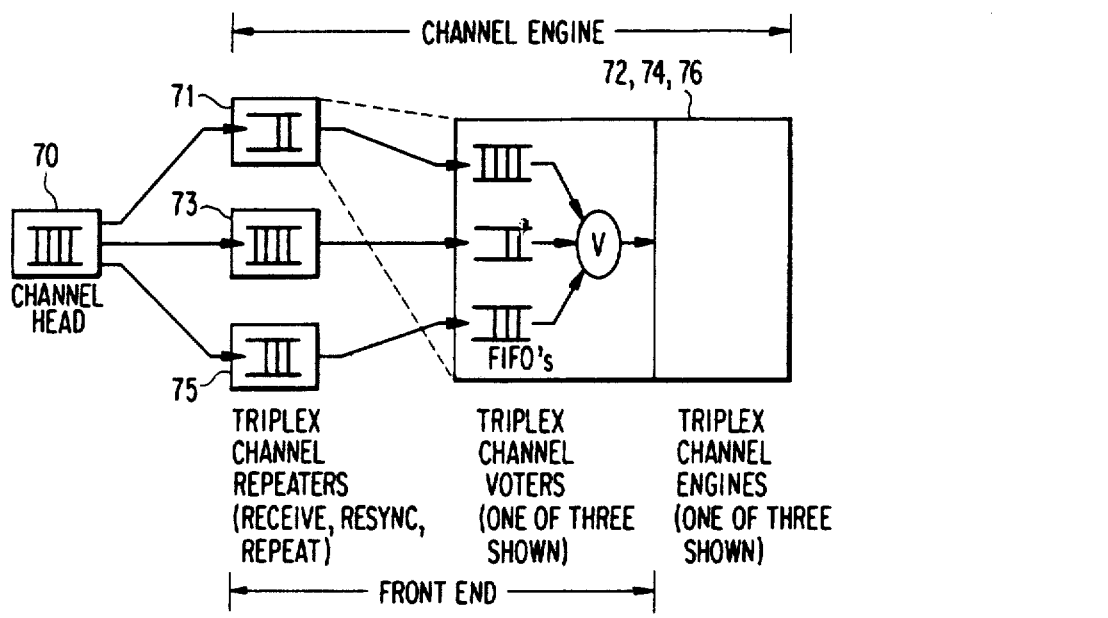
FIG. 9A is a block diagram showing the front end voting I/O channel data flow and FIG. 9B is a block diagram showing the data flow of the outgoing transmissions.

In FIG. 9A, the channel head 70 receives the data stream and replicates the data stream to each of the triplex channel repeaters 71, 73 and 75. The outputs of the triplexed channel repeaters are supplied to each of three triplex channel voters as the input to a channel engine 72, 74 and 76 (only one of which is shown for the sake of simplicity). Each triplexed front-end component, i.e., channel repeater and channel voter, accepts the incoming data stream from the channel head 70, performing the necessary skew compensation using Vernier Skew compensation, as described above.

Figure 9B:
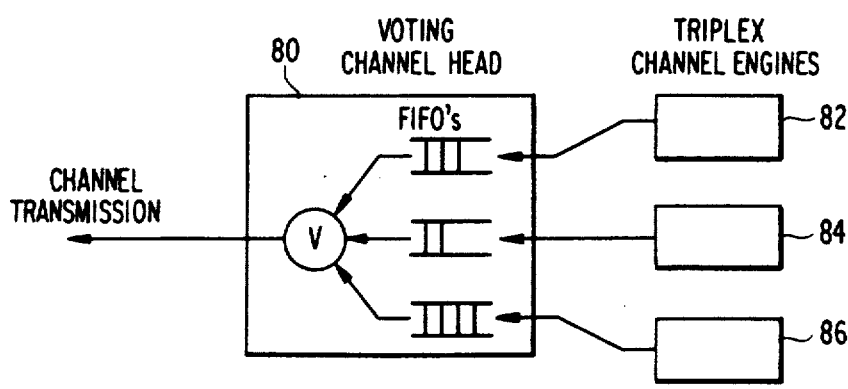

The arrangement is similar for outgoing transmissions as indicated in FIG. 9B except that there is only one stage which requires Vernier Skew compensation. More specifically, the voting channel head 80 receives data streams from triplexed channel engines 82, 84 and 86, performs Vernier Skew compensation and votes the result.

Note that each of the rails may not have received identical incoming data if there is a fault in the channel head or the channel head to channel engine distribution links. To compensate for this possibility, each front-end retransmits the incoming bit stream to one another, as indicated in FIG. 8. Each front-end then deskews these data streams, using Vernier Skew compensation, and votes the triplexed bit stream it receives generating the input bit stream for the back-end channel engine. Any errors (disagreements) which occur in the vote are noted (logged) in an error register associated with the individual front-ends. Note that each of the three voters may see differing errors so that this error syndrome may differ from rail to rail.

While the invention has been described in terms of a single preferred embodiment, those skilled in the art will recognize that the invention may be practiced with modification within the spirit and scope of the appended claims.

Having thus described by invention, what I claim as new and desire to secure by patent is as follows:

1. A technique for automatically removing at a receiver the skew between multiple correlated synchronous data streams transmitted to said receiver by a plurality of transmitters comprising the steps of:

marking at each of said transmitters data streams transmitted by said transmitters into frames under the control of local transmitter clocks, said local transmitter clocks being synchronized with one another;

loading data from said data steams into respective FIFO registers at said receiver under the control of recovered clocks, said recovered clocks being derived from said data streams;

unloading data from said FIFO registers at the receiver under the control of a local receiver clock, said local receiver clock being synchronized with said transmitter clocks;

checking frame marked data in said data streams for a synchronization fault at the receiver, a synchronization fault being a failure to detect a frame mark at a time when said frame mark is expected;

when a synchronization fault is detected for one of said data streams, inhibiting the loading and unloading of the FIFO register for that data stream and then purging the FIFO register;

detecting a frame header in said data stream and enabling the loading of the FIFO register with the first value to arrive which is marked as a frame header; and at a next succeeding time for an expected frame header, initiating normal unloading of the FIFO register.

2. A technique for automatically removing at a receiver the skew between multiple correlated synchronous data streams transmitted to said receiver by a plurality of transmitters comprising the steps of:

marking at each of said transmitters data streams transmitted by said transmitters into data frames under the control of local transmitter clocks, said local transmitter clocks being synchronized with one another;

loading data from said data steams into respective bi-port register arrays at said receiver under the control of first address counters driven by recovered clocks, said recovered clocks being derived from said data streams;

unloading data from said bi-port register arrays at the receiver under the control of second address counters driven by a local receiver clock, said local receiver clock being synchronized with said transmitter clocks; and resetting said first and second address counters on the detection of a frame mark in respective data streams.

3. An apparatus for automatically removing the skew between multiple correlated synchronous data streams comprising:

a plurality of transmitters, each having a local transmitter clock and means for marking each of said data streams into data frames under the control of the local transmitter clock, said local transmitter clocks being synchronized with one another;

receiver means for receiving said data streams and having means for generating recovered clocks from said data streams, means for loading data from said data streams into respective FIFO registers at said receiver means under the control of said recovered clocks, and means for unloading data from said FIFO registers at said receiver means under the control of a local receiver clock, said local receiver clock being synchronized with said transmitter clocks;

means for checking frames marked data in said data streams for a synchronization fault at the receiver, a synchronization fault being a failure to detect a frame mark at a time when said frame mark is expected, and, when a synchronization fault is detected in a data stream, inhibiting the loading and unloading of a corresponding FIFO register and then purging the FIFO register; and means for detecting a frame header in said data stream and enabling the loading of the FIFO register with the first value to arrive which is marked as a frame header and, at the next succeeding time for an expected frame header, initiating normal unloading of the FIFO register.

4. An apparatus for automatically removing the skew between multiple correlated synchronous data streams comprising:

a plurality of transmitters, each having a local transmitter clock and means for marking each of said data streams into data frames under the control of the local transmitter clock, said local transmitter clocks being synchronized with one another;

receiver means for receiving said data streams and having means for generating recovered clocks from said data streams, means for loading data from said data streams into respective bi-port registers arrays under the control of first address counters driven by said recovered clocks;

means at said receiver means for unloading data from said bi-port register arrays under the control of second address counters driven by a local receiver clock, said local receiver clock being synchronized with said transmitter clocks; and means at said receiver means for resetting corresponding ones of said first and second address counters on the detection of a frame mark in respective data streams.

5. A tightly synchronous voting I/O channel for converting from triplex internal data streams to a simplex serial external data stream comprising:

three transmitters, each having a local transmitter clock and means for marking each of said internal data streams into data frames under control of the local transmitter clock, said local transmitter clocks being synchronized with one another;

receiver means for receiving said data streams, said receiver means having means for generating recovered clocks from said data streams, means for loading data from said data streams into respective FIFO registers at said receiver means under the control of said recovered clocks, and means for unloading data from said FIFO registers at said receiver means under the control of a local receiver clock, said local receiver clock being synchronized with said transmitter clocks;

means for checking frames marked data in said data streams for a synchronization at said receiver means, a synchronization fault being a failure to detect a frame mark at a time when said frame mark is expected, and, when a synchronization fault is detected in a data stream, inhibiting the loading and unloading of the FIFO register corresponding to that data stream and then purging the FIFO register;

means for detecting a frame header in said data stream and enabling the loading of the FIFO register with the first value to arrive which is marked as a frame header and, at the next succeeding time for an expected frame header, initiating normal unloading of the FIFO register; and voting means for marking a majority vote of data unloaded from said FIFO registers and transmitting as said simplex external data stream the result of said majority vote.

6. A tightly synchronous voting I/O channel for converting from triplex internal data streams to a simplex serial external data stream comprising:

three transmitters, each having a local transmitter clock and means for marking each of said internal data streams into data frames under control of the local synchronized transmitter clock, said local transmitter clocks being synchronized with one another;

receiver means for receiving said data streams, said receiver means having means for generating recovered clocks from said data streams, means for loading data from said data streams into respective bi-port registers arrays under the control of first address counters driving by said recovered clocks;

means at said receiver means for unloading data from said bi-port register arrays under the control of second address counters driven by a local receiver clock, said local receiver clock being synchronized with said transmitter clocks;

means at said receiver means for resetting said first and second address counters on the detection of a frame mark in respective data streams; and voting means for marking a majority vote of data unloaded from said bi-port arrays and transmitting as said simplex external data stream the result of said majority vote.

7. A tightly synchronous voting I/O channel for converting from a frame marked simplex serial external data stream from a transmitter to triplex internal data streams, said triplex internal data streams being later combined into an internal simplex data stream, said tightly synchronous voting I/O channel comprising:

a channel head for receiving said simplex serial external data stream and transmitting three replicated data streams to triplex channel repeaters, said channel repeaters retransmitting a received data stream;

three channel engines, each connected to receive a retransmitted data stream from each of said channel repeaters;

means at each of said repeaters and said channel engines for generating recovered clocks from said data stream;

a plurality of FIFO registers, one for each of said repeaters and said channel engines;

means at each of said repeaters and said channel engines for loading data from said data streams into respective FIFO registers under the control of said recovered clocks and means for unloading data from said FIFO registers at the receiver under the control of a local receiver clock, said local receiver clock being synchronized with said transmitter and each of said channel engines having voting means for making a majority vote of data unloaded from said FIFO registers;

means at each of said repeaters and said channel engines for checking frame marked data in said data streams for a synchronization fault, a synchronization fault being a failure to detect a frame mark at a time when said frame mark is expected, and, when a synchronization fault is detected in a data stream, inhibiting the loading and unloading of a corresponding FIFO register and then purging the FIFO register; and means for detecting a frame header in said data stream and enabling the loading of the FIFO register with the first value to arrive which is marked as a frame header and, at the next succeeding time for an expected frame header, initiating normal unloading of the FIFO register.

8. A tightly synchronous voting I/O channel for converting from a frame marked simplex serial external data stream from a transmitter to triplex internal data streams, said triplex internal data streams being later combined into an internal simplex data stream, said tightly synchronous voting I/O channel comprising:

a channel head for receiving said simplex serial external data stream and transmitting three replicated data streams to triplex channel repeaters, said channel repeaters retransmitting a received data stream;

three channel engines, each connected to receive a retransmitted data stream from each of said channel repeaters;

means at each of said repeaters and said channel engines for generating recovered clocks from said data stream;

means at each of said repeaters and channel engines for loading data from said data streams into respective bi-port register arrays under the control of first address counters driven by said recovered clocks;

means at said repeaters channel engines for unloading data from said bi-port register arrays under control of second address counters driven by a local clock, said local clock being synchronized with said transmitter and each of said channel engines having voting means for making a majority vote of data unloaded from said bi-port register arrays; and means for resetting said first and second address counters on the detection of a frame mark in respective data streams.

* * * * *